United States Patent [19]
Alcorn et al.

[11] Patent Number: 5,287,442
[45] Date of Patent: Feb. 15, 1994

[54] SERPENTINE RENDERING OF ANTIALIASED VECTORS IN A COMPUTER GRAPHICS SYSTEM

[75] Inventors: Byron Alcorn; Forrest E. Norrod, both of Ft. Collins, Colo.

[73] Assignee: Hewlett-Packard Co., Palo Alto, Calif.

[21] Appl. No.: 639,626

[22] Filed: Jan. 10, 1991

[51] Int. Cl.$^5$ ............................................. G06F 15/62
[52] U.S. Cl. .................................... 395/143; 395/140; 395/141; 395/142
[58] Field of Search .............................. 395/101–103, 395/128–130, 133–139, 140–143, 150, 151, 162, 163

[56] References Cited

U.S. PATENT DOCUMENTS 4,873,515  10/1989  Dickson et al. ............... 395/163 X
4,962,464  10/1990  Henzi et al. ....................... 395/103

OTHER PUBLICATIONS

*Fundamentals of Interactive Computer Graphics*, Chs. 11, 12 by J. D. Foley and A. Van Dam, ISBN: 0-201-144-68-9 (1982).

Primary Examiner—Gary V. Harkcom
Assistant Examiner—Almis Jankus
Attorney, Agent, or Firm—Guy J. Kelley

[57] ABSTRACT

Antialiased vectors, composed of a plurality of pixels along the vector minor axis for each major axis step, are rendered such that consecutively rendered pixels are always adjacent. For each major axis step, pixels are rendered along the minor axis in an order that reverses with each major axis step.

18 Claims, 4 Drawing Sheets

SERPENTINE RENDERING OF ANTIALIASED VECTORS IN A COMPUTER GRAPHICS SYSTEM

FIELD OF THE INVENTION

The present invention relates generally to the field of computer graphics. More particularly, the present invention is related to methods and apparatuses for rendering antialiased vectors in an interactive computer graphics system.

BACKGROUND OF THE INVENTION

The field of computer graphics concerns the creation, storage, manipulation and display of pictures and models of objects by a digital processor. Interactive computer graphics is the subclass of computer graphics in which a user dynamically controls the picture's content, format, size or color on a display surface by means of an interaction device such as a keyboard, lever or joystick. see *Fundamentals of Interactive Computer Graphics*, by J. D. Foley and A. Van Dam, ISBN: 0-201-14468-9. The creation of synthetic images (i.e., images which exist as abstract collections of lines, points, curves, etc., in the computer's memory) is the usual domain of interactive computer graphics. This is in contrast to the creation of images of real objects, which come directly or indirectly from a scanning device of some sort, e.g., a film scanner, TV scanner, ultrasound scanner, etc.

There are two primary classes of interactive computer graphics systems: random-scan and raster-scan systems. Images displayed by a random-scan system are encoded as commands to draw each output primitive (i.e., point, line or polygon) by plotting individual points or drawing connecting lines between specified starting and ending coordinates of line segments. Polygons are simply treated as a closed series of line segments. Encoding for a raster-scan system is much simpler: output primitives are broken up into their constituent points for display. The major difference between a simple point-plotting random-scan system and a raster-scan system is in the organization of the stored data used to drive the display. (As explained below, the data is stored in a frame buffer or refresh buffer.) In the random-scan display system, the component points of each successive output primitive are stored sequentially in memory and are plotted in that order, one point at a time. This is because the beam may be moved randomly on the screen. In the raster-scan display system, the refresh memory is arranged as a 2-dimensional array of data. The entry or value stored at a particular row and column encodes an intensity and/or color value of a corresponding display element on the screen. By convention, the location of each display element is specified by a unique (X,Y) coordinate. Z conventionally represents the depth ordinate.

Since each memory location defines a single point-sized element of an image, both the display screen location and its corresponding memory location are often called a "pixel, short for the image processing term "picture element." Hereinafter, to avoid confusion, the term "display pixel" will be used to indicate picture elements of a display device, and "storage pixel" to indicate memory locations corresponding to the display pixels.

FIG. 1 is a simplified block diagram of a typical prior art raster-scan graphic system. Such a system includes an image creation system 12, an image storage system 14 (such as a refresh buffer or frame buffer), an image display system 16, a raster display 18 and an interaction device 20. The image creation system 12 converts output primitives into the data stored in the refresh buffer or frame buffer of the image storage system 14. The instruction set processing speed of the image creation system 12 establishes most of the characteristics of the raster-scan system 10. Moreover, the image creation system 12 is particularly malleable because it is typically implemented with a microprocessor. See Chapter 12 of *Fundamentals of Interactive Computer Graphics*, referenced above.

The overall speed with which all or part of the image storage data can be changed is dependent upon:
(i) how fast the application program operates;
(ii) how fast the computer prepares instructions to the display;
(ii) how fast the instructions are conveyed to the display; and
(iv) how fast the image creation system executes instructions.

It is the last process (the image creation system's execution of instructions) which is often the slowest, because the scan conversion algorithm typically requires many iterations. Usually the faster this process, the faster the overall system response time to user commands. Moreover, it is well known that response time is critical to user satisfaction.

There is a fundamental mismatch between the two dimensional array of pixel values used to drive a raster-scan display and the lines, points, and areas used to represent images by the image creation system 12. The process of converting a line, point, and area representation to the pixel data array of the image storage system 14 is called "scan conversion." Such scan conversion algorithms are universally needed in an interactive raster-scan graphics system, and are usually incorporated into the image creation system 12.

The scan conversion algorithm used in a raster-scan graphics system will be invoked quite often, typically hundreds or even thousandths of times each time an image is created or modified. Hence, it must not only create visually satisfactory images, but must also execute as rapidly as possible. Indeed speed versus image quality is the basic tradeoff in selecting a scan conversion algorithm. Some are fast and give jagged edges, while others are slower but give smoother edges. However, it can generally be said that faster is better for a given image quality.

FIG. 2 depicts an exemplary line, $y = mx + b$, along with a vector 22 as it might be rendered (i.e., stored) in the frame buffer of the image storage system 14 (and thus displayed on the display 18). (It should be noted that the term "render" is used herein to refer to the process of storing pixel data in the frame buffer and/or displaying data stored in the frame buffer on the display device.) Vector 22 is composed of a set of display and corresponding storage pixels $P_0, P_1, P_2, \ldots P_N$. The vector is rendered by stepping along the major axis, in this case the X-axis, and computing the corresponding minor axis (Y-axis) ordinate values. These (X,Y) coordinates define the storage and display pixels composing the vector 22. The basic task of a scan conversion algorithm for lines is to compute the integer coordinates of the display pixels lying nearest the line.

As can be seen from vector 22 depicted in FIG. 2, the limited resolution of the frame buffer 14 and display 18 causes the vector to become jagged, or "aliased." Techniques for generating antialiased (i.e., smooth) vectors are known in the art. See, for example, Chapter 11.2.3 of *Fundamentals of Interactive Computer Graphics*, referenced above, and references cited therein for details of known antialiasing techniques. These known antialiasing techniques however, while producing visually acceptable images, are too slow for many applications. The object of the present invention is therefore to provide an efficient and rapid method and apparatus for rendering antialiased vectors.

SUMMARY OF THE INVENTION

The present invention provides a method and apparatus for rendering an antialiased vector in an interactive computer graphics system. According to the invention, an antialiased vector is rendered by first rendering, at the first major axis step, a first set of pixels in a first direction along the minor axis. Next, at the second major axis step, a second set of pixels is rendered in a second direction along the minor axis, the second direction being opposite to the first direction. Then, at the third and all subsequent major axis steps corresponding third and subsequent sets of pixels are rendered along the minor axis in respective directions that reverse with each major axis step.

In a preferred embodiment of the invention, an interactive graphics system comprises an image creation system for generating pixel data, a frame buffer coupled to the image creation system, a raster-scan display coupled to receive pixel data from the frame buffer, and means, coupled to the frame buffer, for rendering antialiased vectors in the frame buffer as described above.

DETAILED DESCRIPTION OF THE PREFERRED EMBODIMENT

Figure 1:
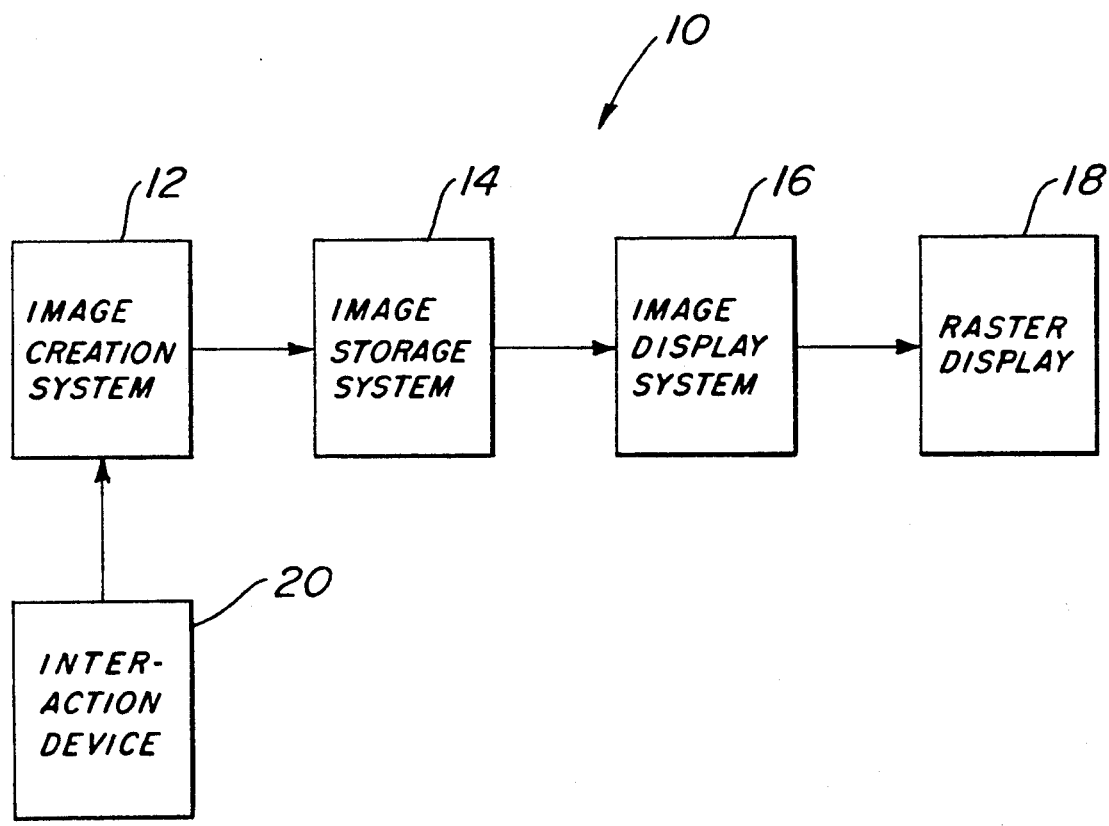
FIG. 1 is a block diagram of a basic raster-scan graphics system of the prior art.
Figure 2:
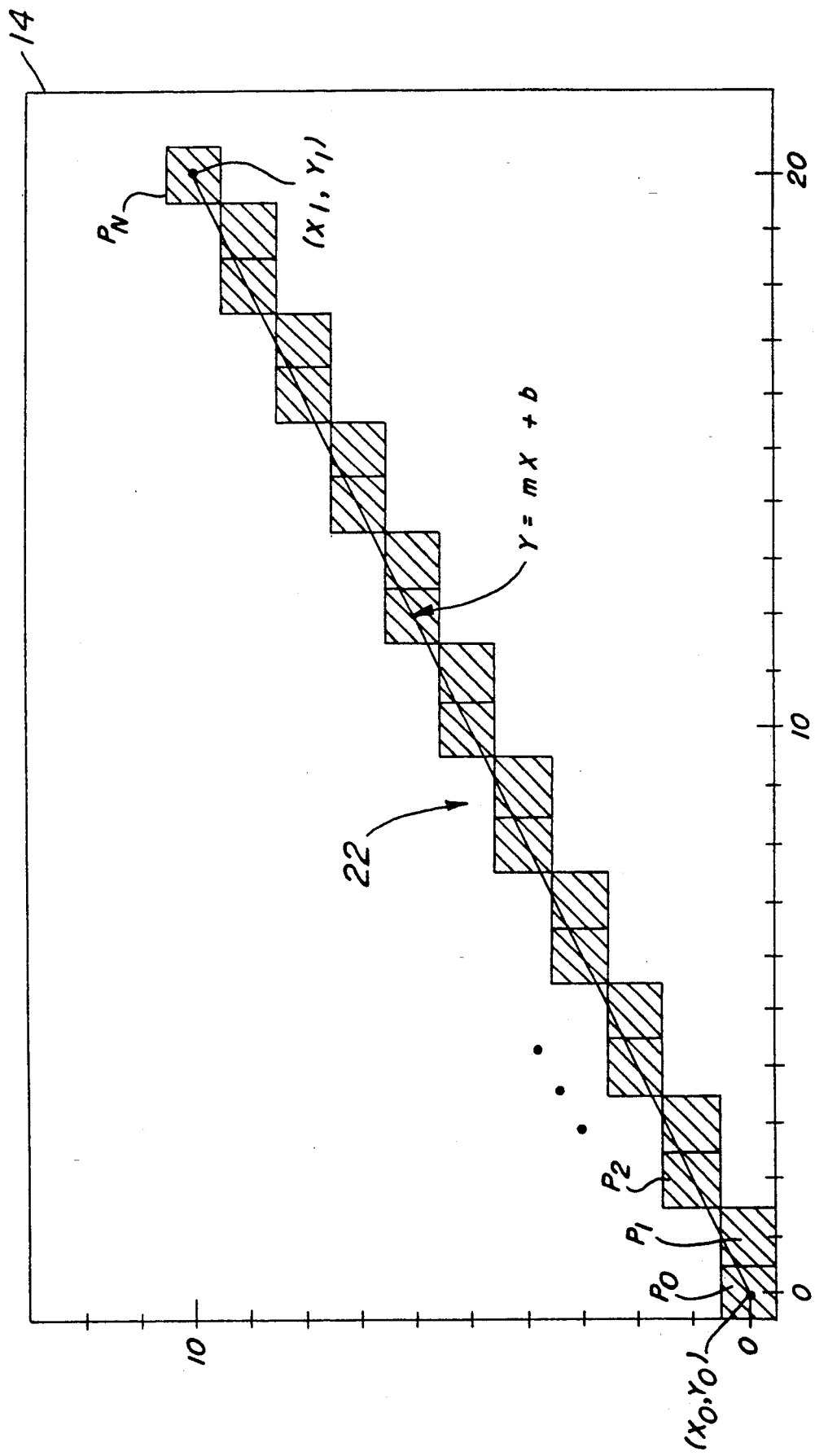
FIG. 2 is a simplified representation of an aliased vector obtained with the prior art system.
Figure 3:
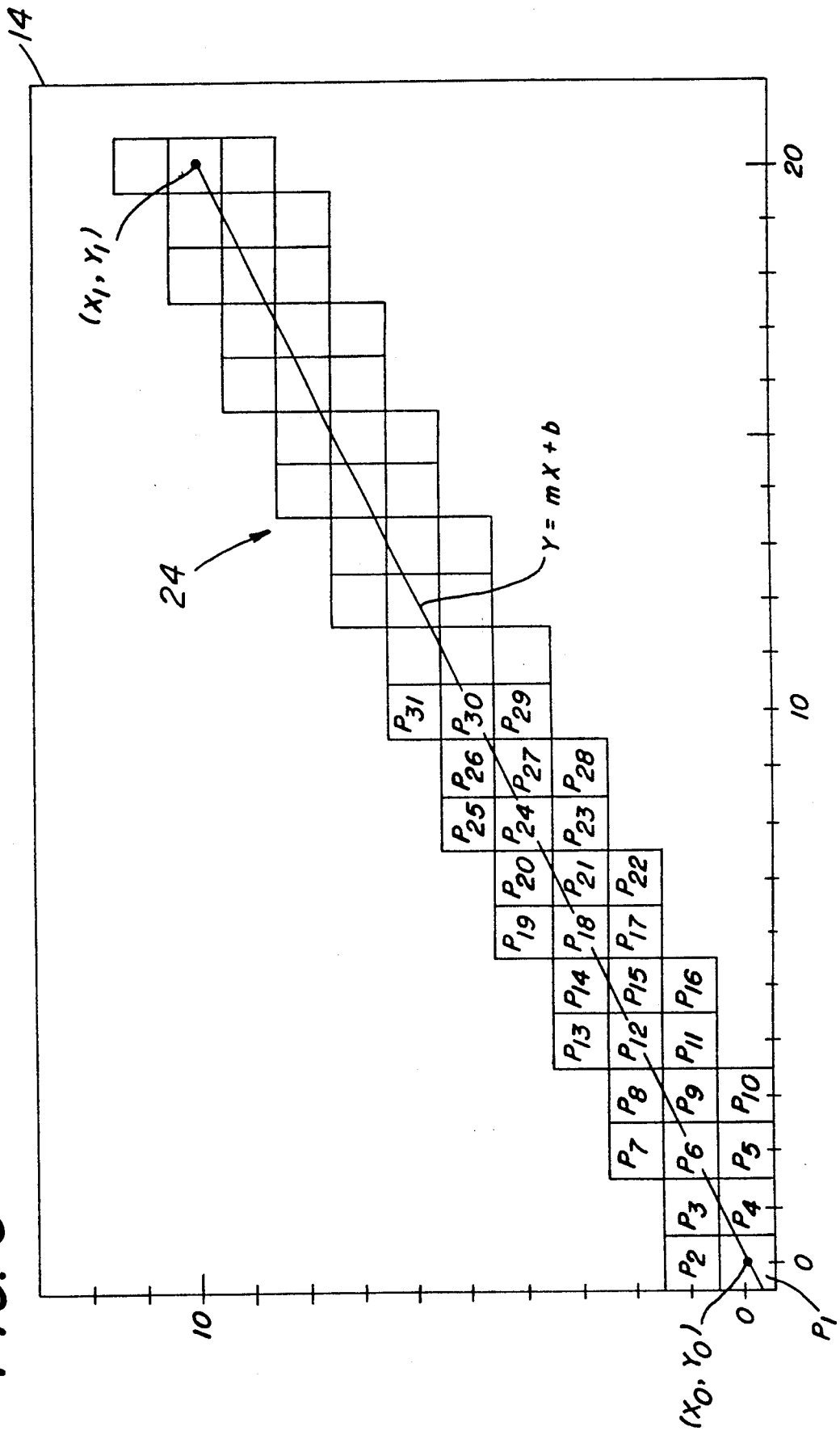
FIG. 3 is a simplified representation of an antialiased vector rendered in accordance with the present invention.

FIG. 3 depicts an antialiased vector 24 corresponding to the line $y=mx+b$ from the point ($X_0=0$, $Y_0=0$) to the point ($X_1=20$, $Y_1=10$) generated in accordance with the present invention. This is the same line represented in FIG. 2 by the aliased vector 22. According to the present invention, the antialiased vector 24 is rendered in a "serpentine" fashion; i.e., pixel data for the vector are generated and stored in the frame buffer of the storage system 14 such that consecutively rendered pixels are always adjacent. This method of rendering an antialiased vector (or any vector with more than one pixel along the vector minor axis for each major axis step) increases the tile hit rate in the frame buffer's cache memory (when the frame buffer's pixel cache is organized into tiles, as described in copending application Ser. No. 494,992 —Alcorn et al.), decreases the number of addresses required to be written by the image display system 16 or image creation system 12, and improves the overall speed and efficiency of rendering the vector.

Turning to FIG. 3, the antialiased vector 24 is preferably composed of three pixels for each major axis step. The exemplary vector 24 has a major axis in the horizontal (X) direction and a minor axis in the vertical (Y) direction. The vector is rendered at each major axis step (beginning at the first major axis step $X_0$) by rendering groups of three pixels along the minor axis. The Y ordinate of the middle pixel in each group of three pixels corresponds as nearly as possible to the ideal line $y=mx+b$. As with the aliased vector 22 discussed above, there will still be some quantization error due to the limited number of storage pixels in the frame buffer and the limited number of display pixels.

According to the invention, the smoother appearance of the antialiased vector 24 is achieved by tapering the intensity distribution of the display pixels along the vector minor axis (Y-axis). For example, one such scheme is to assign all pixels centered exactly on the line $y=mx+b$ (e.g., $P_1$, $P_{30}$) a peak intensity, and assign its neighboring pixels along the minor axis an intensity less than the peak intensity. A set of pixels centered below (above) the line (e.g., $P_8$, $P_9$, $P_{10}$) is assigned an intensity distribution weighted more heavily above (below) the line. There are many possible intensity distribution functions that would achieve a satisfactory result, however the Sinc function ($\sin Y/Y$) is most preferred.

The exemplary vector 24 is rendered by first rendering pixel $P_1$, then $P_2$, then $P_3$, then $P_4$ and so on, in the order shown. Note that, at each new major axis step, the rendering order along the minor axis changes direction. For example, at the first major axis step $P_1$ and $P_2$ are rendered in the positive minor axis direction, while at the second major axis step $P_3$ and $P_4$ are rendered in the negative minor axis direction.

The reason there are only two pixels at each of the first two major axis steps is that, because the line $y=mx+b$ being represented begins at the origin (0,0) of the display, there are no pixels below pixels $P_1$ and $P_4$. These missing display pixels do not significantly detract from the otherwise pleasing appearance (comparatively speaking) of the antialiased vector 24. It should also be noted that in the preferred embodiment the direction in which the first set of pixels $P_1$, $P_2$ are rendered is determined by the slope of the vector, i.e., the first direction is positive with respect to the minor axis if the slope is positive, and negative if the slope is negative.

Figure 4:
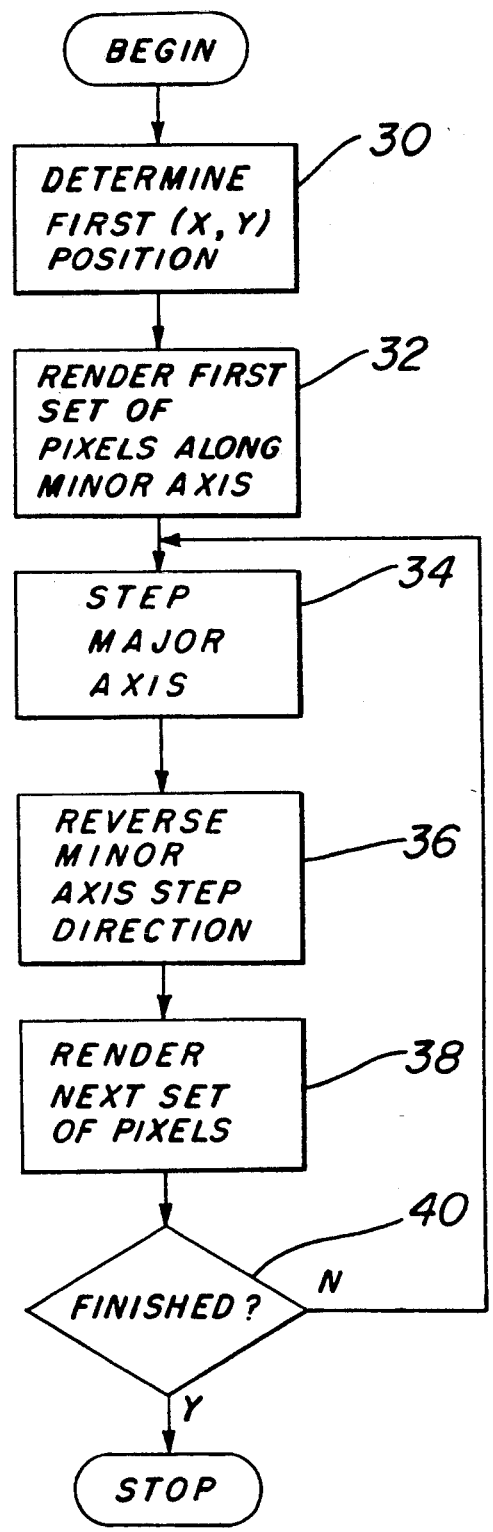
FIG. 4 is a flowchart of a method for rendering antialiased vectors in accordance with the present invention.

Referring now to FIG. 4, a method for rendering antialiased vectors in accordance with the present invention comprises the following steps: First an initial (X,Y) pixel position is determined, step 30. Next, at the first major axis step, a first set of pixels is rendered in a first direction along the minor axis, step 32. Next, the major axis is stepped one pixel, step 34. Next, the minor axis step direction is reversed, step 36. Next, a second set of pixels is rendered in a second direction along the minor axis, the second direction being opposite to the first direction, step 38. Next, a check is made of whether there are more pixels to render, step 40. If not, the rendering is stopped. If there are more pixels to be rendered, the algorithm loops back to step 34 and continues to render the vector by stepping along the major axis and rendering subsequent sets of pixels along the minor axis in respective directions that reverse with each major axis step.

As a final point, it is noted that many variations and modifications of the method and apparatus described above will be apparent to those skilled in the art. Accordingly, the invention is not limited to the specific embodiments described. For example, the invention is not limited to the use of any specific number of pixels for each major axis step, or to any specific intensity distribution scheme for assigning values to the respective pixels to achieve the more pleasing antialiased look. Rather, the invention is intended to be limited only by the following claims.

What is claimed is:

1. In a computer graphics system, a method for rendering an antialiased vector, wherein "rendering" refers to writing pixel data to locations defined by coordinates along a major axis and a minor axis of a display associated with the computer graphics system, comprising the steps of:
   (a) rendering, at a first major axis step, a first set of pixels in a first direction along a minor axis, said first major axis step being a first point along said major axis;
   (b) rendering, at a second major axis step, a second set of pixels in a second direction along said minor axis, said second direction being opposite to said first direction, said second major axis step being a second point along said major axis; and
   (c) rendering, at a third and subsequent major axis steps, corresponding third and subsequent sets of pixels along said minor axis in respective directions that reverse with each major axis step, said third and subsequent major axis steps being a third and subsequent point along said major axis;
   wherein said first, second, third, and subsequent sets of pixels define said antialiased vector.

2. The method for rendering an antialiased vector recited in claim 1, wherein said first direction is determined by a slope of said vector.

3. The method for rendering an antialiased vector recited in claim 2, wherein said first direction is positive with respect to the minor axis if the slope is positive.

4. The method for rendering an antialiased vector recited in claim 1, further comprising:
   (d) displaying said first, second, third and subsequent sets of pixels.

5. The method for rendering an antialiased vector recited in claim 4, wherein said first direction is determined by the slope of said vector.

6. The method for rendering an antialiased vector recited in claim 5, wherein said first direction is positive with respect to the minor axis if the slope is positive.

7. The method for rendering an antialiased vector recited in claim 6, wherein said rendering steps (a), (b), (c) comprise storing pixel data in a frame buffer comprising a plurality of storage pixels, each storage pixel being associated with a display pixel.

8. The method for rendering an antialiased vector recited in claim 7, wherein pixels corresponding to a given major axis step are assigned values that vary in accordance with a predefined function.

9. A graphics system for displaying images comprising antialiased vectors, wherein "rendering" refers to writing pixel data to locations defined by coordinates along a major axis and a minor axis of a display, said system comprising:
   (a) means for rendering, at a first major axis step, a first set of pixels in a first direction along a minor axis, said first major axis step being a first point along said major axis;
   (b) means for rendering, at a second major axis step, a second set of pixels in a second direction along said minor axis, said second direction being opposite to said first direction, said second major axis step being a second point along said major axis; and
   (c) means for rendering, at a third and subsequent major axis steps, corresponding third and subsequent sets of pixels along said minor axis in respective directions that reverse with each major axis step, said third and subsequent major axis steps being a third and subsequent point along said major axis;
   wherein said first, second, third, and subsequent sets of pixels define said antialiased vector.

10. The graphics system recited in claim 9, wherein said first direction is determined by a slope of said vector.

11. The graphics system recited in claim 10, wherein said first direction is positive with respect to the minor axis if the slope is positive.

12. The graphics system recited in claim 9, further comprising:
   (d) a display for displaying said first, second, third and subsequent sets of pixels.

13. The graphics system recited in claim 12, wherein said first direction is determined by the slope of said vector.

14. The graphics system recited in claim 13, wherein said first direction is positive with respect to the minor axis if the slope is positive.

15. The graphics system recited in claim 14, further comprising a frame buffer comprising a plurality of storage pixels, each storage pixel being associated with a location on the display, and wherein said rendering means (a), (b), (c) comprise means for storing pixel data in said frame buffer.

16. An interactive graphics system, comprising:
   (a) an image creation system for generating pixel data;
   (b) a frame buffer, coupled to said image creation system, comprising a plurality of storage pixels for storing said pixel data;
   (c) a raster-scan display, coupled to receive said pixel data form said frame buffer, comprising a plurality of display pixels each of which is adapted to display data stored in an associated one of said storage pixels; and
   (d) means, coupled to said frame buffer, for rendering an antialiased vector in said frame buffer, wherein "rendering" refers to writing pixel data to locations defined by coordinates along a major axis and a minor axis of said display, comprising:
   (i) means for rendering, at a first major axis step, a first set of pixels in a first direction along a minor axis, said first major axis step being a first point along said major axis;
   (ii) means for rendering, at a second major axis step, a second set of pixels in a second direction along said minor axis, said second direction being opposite to said first direction, said second major axis step being a second point along said major axis; and
   (iii) means for rendering, at a third and subsequent major axis steps, corresponding third and subsequent sets of pixels along said minor axis in respective directions that reverse with each major axis step, said third and subsequent major axis steps being a third and subsequent points along said major axis;
   wherein said first, second, third, and subsequent sets of pixels define said antialiased vector.

17. The graphics system recited in claim 16, wherein said first direction is determined by a slope of said vector.

18. The graphics system recited in claim 17, wherein said first direction is positive with respect to the minor axis if the slope is positive.

* * * * *

UNITED STATES PATENT AND TRADEMARK OFFICE
CERTIFICATE OF CORRECTION

PATENT NO. : 5,287,442
DATED : February 15, 1994
INVENTOR(S) : Byron A. Alcorn, et al.

It is certified that error appears in the above-identified patent and that said Letters Patent is hereby corrected as shown below:

In claim 16, column 6, line 37, delete "form" and insert therefor --from--.

Signed and Sealed this

Ninth Day of June, 1998

Attest:

BRUCE LEHMAN

*Attesting Officer*  *Commissioner of Patents and Trademarks*